United States Patent
Baum

(10) Patent No.: US 7,837,957 B2
(45) Date of Patent: Nov. 23, 2010

(54) MANUFACTURING DEVICE AND SYSTEM FOR PREPARING FINE POWDER POLYUREA AND GREASES THEREFROM

(75) Inventor: Mark W. Baum, Sewell, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 578 days.

(21) Appl. No.: 11/656,806

(22) Filed: Jan. 23, 2007

(65) Prior Publication Data

US 2007/0203036 A1   Aug. 30, 2007

Related U.S. Application Data

(60) Provisional application No. 60/761,805, filed on Jan. 24, 2006.

(51) Int. Cl.
  *B01J 19/00* (2006.01)
  *B01J 8/08* (2006.01)
  *B01F 15/00* (2006.01)
(52) U.S. Cl. .................. 422/224; 422/232; 422/131; 422/133; 422/135; 366/162.4; 366/165.4
(58) Field of Classification Search ............... 422/232, 422/224, 131, 133, 135; 366/162.4, 165.4
See application file for complete search history.

(56) References Cited

U.S. PATENT DOCUMENTS

| 4,440,500 | A | 4/1984 | Schneider |
| 5,160,645 | A | 11/1992 | Okaniwa et al. |
| 5,207,936 | A | 5/1993 | Anzai et al. |
| 5,314,982 | A | 5/1994 | Rasp et al. |
| 5,516,439 | A | 5/1996 | Takeuchi et al. |
| 5,585,336 | A | 12/1996 | Ozaki et al. |
| 6,403,752 | B1 | 6/2002 | House et al. |
| 6,498,130 | B2 | 12/2002 | Baum et al. |
| 6,803,425 | B2 | 10/2004 | Hintzer et al. |
| 2002/0055175 | A1* | 5/2002 | Casal et al. ............... 436/55 |
| 2006/0058203 | A1* | 3/2006 | Laufer et al. ............ 508/552 |

FOREIGN PATENT DOCUMENTS

EP   0 613 940 B1   9/1994

* cited by examiner

*Primary Examiner*—Walter D Griffin
*Assistant Examiner*—Lessanework Seifu

(57) ABSTRACT

A system and device for preparing polyurea compounds. The system comprising a chamber for reacting amines and isocyanates in the presence of a liquid diluent in a high-pressure impingement mixing device under conditions sufficient to produce a polyurea compound having the consistency of a powder and in which diluent is dispersed.

17 Claims, 2 Drawing Sheets

MANUFACTURING DEVICE AND SYSTEM
FOR PREPARING FINE POWDER
POLYUREA AND GREASES THEREFROM

This application claims benefit of U.S. Ser. No. 60/761,805 filed Jan. 24, 2006.

FIELD OF THE INVENTION

The present invention relates to the manufacture of polyurea powder and the manufacture of greases therefrom.

BACKGROUND OF THE INVENTION

Industrial lubricating greases are homogeneous products of semi-liquid to solid consistency. Essentially, they consist of a dispersion of a thickener in a liquid lubricant or base oil. In general, the thickener is a significant determinant of the properties of the greases.

Polyurea compounds are among the thickeners used in making greases. Often the polyurea compounds are prepared directly in the base oil by the reaction of amines with isocyanates.

One method to test the performance of greases is cone penetration and prolonged working of lubricating greases through ASTM D217. A cone of specified weight is allowed to fall into a lubricating grease sample at 25° C. The depth of the cone, in tenths of a millimeter, identifies the consistency of the grease. With the use of Table 1, the NLGI grade of the grease is identified from the 60 stroke worked penetration.

TABLE 1

NLGI Classification Scale

| NLGI Grade | ASTM Worked Penetration |
|---|---|
| 000 | 445-475 |
| 00 | 400-430 |
| 0 | 355-385 |
| 1 | 310-340 |
| 2 | 265-295 |
| 3 | 220-250 |
| 4 | 175-205 |
| 5 | 130-160 |
| 6 | 85-115 |

This test can be used to determine the mechanical stability of a grease through prolonged working, such as 10,000 or more double strokes using the motorized grease worker. While cone penetrations are typically conducted at 25° C. measurements can be carried out at other temperatures. About 300 grams of grease are required to conduct the ASTM D217 test. ASTM method D1403, DIN 51 804, and IP 310 describe cone penetration equipment commonly referred to as ½ and ¼ scale devices for use when less than 300 grams of grease are available.

Dropping point of lubricating greases is used to determine high temperature structural grease properties related to the thickener. In ASTM D2265, dropping point of a lubricating grease is the temperature at which the thickener can no longer hold the base oil. Some of the reasons oil can no longer be held are that the thickener has melted or the oil has become so thin it is not held by thickener. Grease is placed in a small cup and heated in an oven-like device. When a drop of oil falls from the lower opening, the dropping point of the grease is calculated using the temperatures in the oven and inside the cup. Soap or polymer thickened greases demonstrate a dropping point while inorganic thickeners such as clay or graphite may not have a dropping point.

In U.S. Pat. No. 5,314,982 there is disclosed a process for making polyurea greases by first making a dry polyurea compound. Then the compound is pulverized to give powders having particles in the 100 to 400 micron range. Thereafter, a paste of the powder and base oil is heated, cooled and homogenized in a high pressure homogenizer at pressures of 400 to 1500 bar.

In U. S. Pat. No. 6,498,130 B2 a grease having low noise characteristics is made by shearing a base oil and thickener to reduce the thickener particles below about 500 microns in size. In this instance homogenization is achieved at about 2000 psi.

Both the above mentioned patents show the desirability of using polyurea of small particle size. They also illustrate that the conditions under which the polyurea particles are prepared impact subsequent processing conditions such as the homogenization step in grease forming.

User demand for polyurea greases has been increasing steadily; however, manufacturing such greases has been more difficult and expensive when compared to the manufacture of other greases.

One of the difficulties in manufacturing polyurea greases is consistently obtaining on an industrial scale substantially uniformly fine polyurea powder that is readily dispersible in a lubricating base oil.

Accordingly, one object of the present invention is to provide a process for making fine polyurea powder without the need for shearing or pulverizing large polyurea particles.

Another object of the invention is to provide a process for making fine powdered polyurea compounds which can be practiced on an industrial scale and that can be homogenized under standard grease homogenizing conditions.

Yet another object of the invention is to provide an improved method for preparing polyurea greases thus greatly reducing the risk (hazards) associated in manufacturing with neat amines or isocyanates.

These and other objects of the invention will become more apparent from the following description.

SUMMARY OF THE INVENTION

Broadly stated, polyurea compounds are prepared by reacting amines and isocyanates in the presence of a liquid diluent in a high-pressure impingement mixing device under conditions sufficient to produce polyurea compounds having the consistency of a powder and in which diluent is dispersed.

An embodiment of the invention comprises passing the powder formed through a containment zone having means for monitoring and controlling the process.

Other embodiments and aspects will be clear from the following detailed description.

DETAILED DESCRIPTION OF THE INVENTION

In the practice of the invention primary amines and isocyanates are reacted to form polyurea compounds.

The amines include aliphatic, alicyclic, aromatic amines and mixtures thereof. Examples of such mono amines include pentylamine, hexylamine, heptylamine, octylamine, dodecylamine, cyclohexylamine, benzylamine, aniline, diamnes and the like.

Suitable isocyanates are selected from the group consisting of polyisocyanate, monoisocyanate, and diisocyanate, and any combination thereof. Preferably, a diisocyanate is used. Furthermore, the isocyanate component may be aliphatic or aromatic and preferably is selected from an aromatic diisocyanate or mixtures of aromatic diisocyanates. Examples of such diisocyanates are phenylene diisocyanate, toluene diisocyanate, methylene diphenylene diisocyanate and the like. Typically, the amines and isocyanates are reacted in mole ratios of about 1:1 to about 2:1 and greater.

In one embodiment, A system is created for preparing polyurea compounds. The system comprising a chamber for reacting amines and isocyanates in the presence of a liquid diluent in a high-pressure impingement mixing device under conditions sufficient to produce a polyurea compound having the consistency of a powder and in which diluent is dispersed. The impingement mixing device reacts two or more components under relatively high pressure through a mixing chamber (spray-head) dispensing the material.

In another embodiment, a system for preparing polyurea grease is created. The system having means for pumping amines and isocyanates in the presence of a liquid diluent in a high-pressure impingement mixing device under conditions sufficient to produce a polyurea compound having the consistency of a powder and in which diluent is dispersed, means for processing the polyurea and a lubricating oil in a processing vessel at temperatures less than 350° F., means for milling the processed polyurea and lubricating oil at a pressure less than 2000 psi, and means for cooling the processed polyurea to form polyurea grease. Optionally, this system may have means for additizing the grease to achieve favorable properties.

Figure 1:
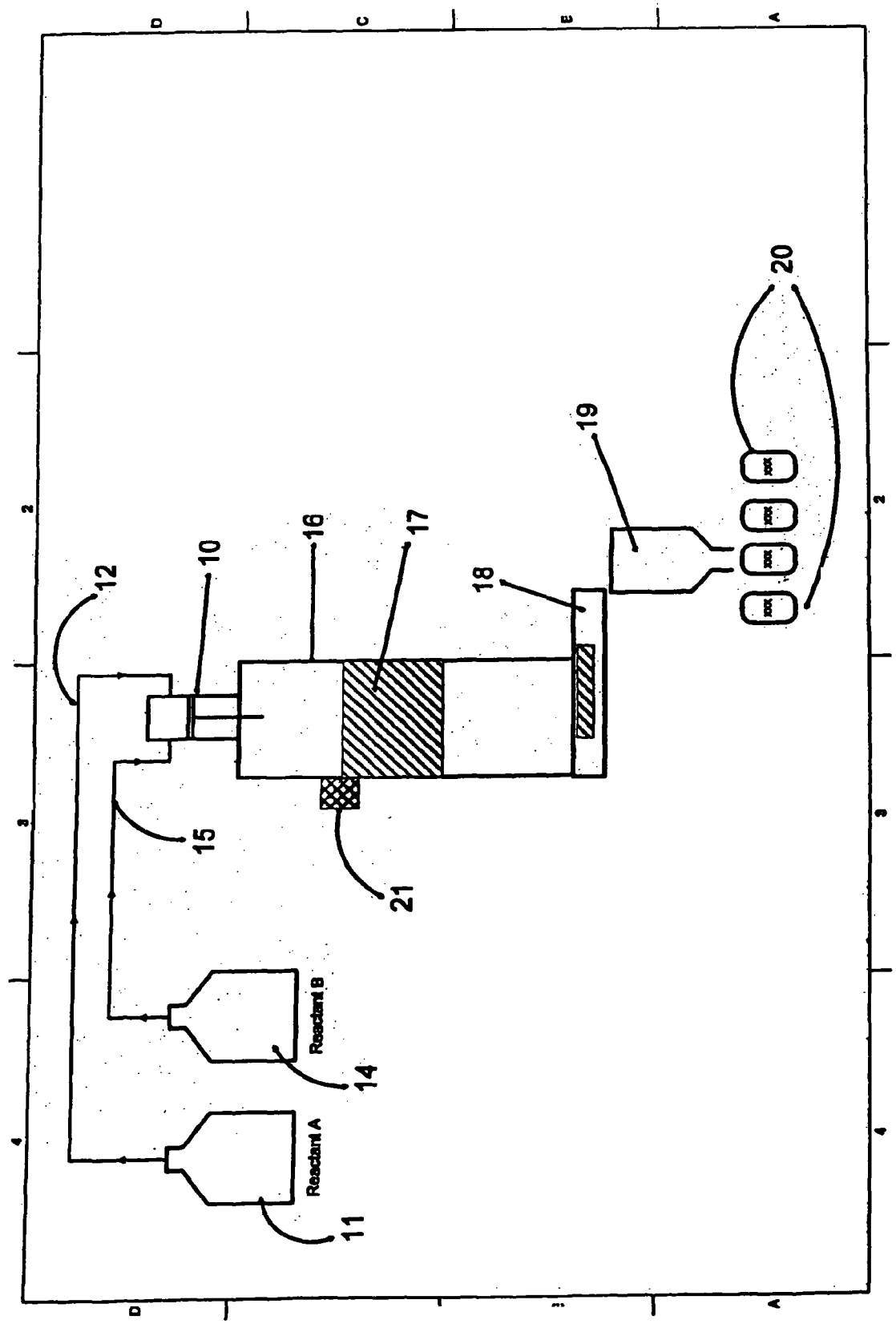
FIG. 1 is a diagram of the machine device used to make polyurea.

In the invention an amine and isocyanate is reacted in the presence of a liquid diluent in a high-pressure impingement mixing device such as impingement device 10 shown in FIG. 1. In one embodiment of this invention, a novel device for making a particulate polyurea composition is utilized. This device comprises an impingement reactor, pumps suitable for feeding a solution of an amine or isocyanate and a lubricating medium or solvent into an impingement reactor (mix chamber) while feeding a isocyanine into the impingement reactor, an orifice on the impingement reactor for spraying the particulate polyurea formed by the reaction of isocyanine with the solution.

In another embodiment, a device for making grease is utilized. This device comprises a processing vessel for mixing a base lubricating oil and a polyurea particle, means for heating the mixture of base oil and polyurea to a temperature in the range of about 150° C. to about 175° C.; and a milling device for milling the heated mixture to form a homogenized grease at pressure less than 2000 psi. The device making polyurea and for making grease can be combined into one device or system.

The liquid diluent employed in the practice of the present invention is one which is inert to the amines and/or isocyanates and is compatible with the components of any end product to be formed from the polyurea. Thus, in instances where the polyurea product is to be used as a grease thickener, a lubricating base oil suitable to grease formulations is a preferred diluent. Additionally, it is preferred that the amine or polyisocyanate be readily soluble in the diluent. In general, it is preferred to dissolve the amine in a base oil and preferably naphthenic, paraffinic, PAO, PAG and ester fluids can be used singularly or in combination as a diluent for either component individually or simultaneously. Also, any carbon base solvents that are compatible with either of the two components can be used as a diluent.

The amount of diluent used is not absolutely critical and will depend to a certain extent upon the solubility of the reactant, e.g., the amine in the diluent. Indeed, in the present invention, it is preferred to dissolve the amine in the diluent. Again, the diluent is not subjected to just amine alone but can be combined with the isocyanate. At least sufficient diluent is used to dissolve (disperse) the amine, and preferably, the amount of diluent will be sufficient to provide a solution having about the same density as that of the isocyanate or polyisocyanate—diluent combination. In the case where a naphthenic oil is used as diluent for the amine, the weight ratio of oil to amine will be about 1:1 to about 1:3.

Experience has shown that in the absence of diluent, the impingement device plugs almost immediately, and the polyurea formed typically has a significant amount of unreacted isocyanate groups, a result which is not desirable.

Referring to the FIG. 1, isocyanate contained in vessel 11 is fed via line 12 to impingement device 10, while primary amine and diluent contained in vessel 14 is fed via line 15 to impingement device 10.

Means (not shown) which are typically pumps are provided for regulating the flow of reactants from their respective vessels through orifices in the impingement device 10 (mix chamber) where the components are impinged and reacted.

The reactants are fed to impingement device 10 (mix chamber) under conditions sufficient to produce a polyurea compound having the consistency of a powder and in which diluent is dispersed. The fluid composition of the solution or emulsion can be from 0.5:1 to 4:1 by weight of diluent to component. As presented in Lazer Light Scattering analysis performed for particle size determination, the polyurea compound will comprise particles between 700 to 10 microns with a standard size being 200 microns.

Conditions that impact the size of the particles produced include the reactor orifice size (dimensions of the mix chamber), flow rates, pressure, individual component temperature and reactant residence time.

The flow rates of the reactants are typically in the mole ratio range described above.

The reactor orifice size for the amine and diluent and isocyanates typically will be different from that for the diisocyanate and generally will be chosen for facilitating the metering of the reactants in the appropriate mole ratio. Typically, the reactor orifice diameter will range from about 0.030 to about 0.150 inches; however, the reactor orifice diameter for the amine/diluent feed generally will be larger than that for the isocyante.

The pressure at which the reactants are fed into the impingement device typically will be above 500 psig and preferably 1000 psig to 1800 psig, while the temperature at which they are fed may range from about 0° C. to about 100° C. and preferably 24° C. to 55° C. The reactant residence time is a function of reactant feed rate and reactor volume, i.e., specified design of the mix chamber, the adjustment of which is well within the skill of a routiner in the art.

In one embodiment the fine powdered polyurea formed in impingement device 10 falls through a containment zone 16 as shown in the FIG. 1. The containment zone 16 may be and preferably is equipped with an antistatic device 17. The finely divided powdered polyurea then may be collected on a conveyer belt system 18 for delivery to hopper 19 from which it can be automatically fed to packaging material 20, such as, bags, boxes or the like.

In another embodiment of the invention, containment zone 16 is provided with product monitoring and control means 21. Such monitoring means may include an infrared spectrometer for detecting the presence of free isocyanate groups and a microscopy device for determining the size of the particles. Preferably, the monitoring means are operably connected to a computerized control device that functions to adjust processing conditions as necessary to produce particles of the requisite size.

The finely divided particulate polyurea powder, comprising from 5 to 15% of the total weight of base grease, is particularly suitable for forming greases and is mixed with a base lubricating oil, comprising from 85 to 95% of weight of base grease. The base lubricating fluid and polyurea powder are together placed in a conventional grease kettle or grease contactor at ambient temperature where it is dispersed, sheared (milled), mixed and heated to a top temperature in the range of about 150° C. to 175° C., cooled to a specified temperature then milled (homogenized) to form a finished homogenous grease.

In one embodiment, the milling is performed between 500 to 2000 psi in a Gaulin Mill Homogenizer which is a common pressure range for the finished mill pressures of a polyurea grease. In a preferred embodiment, the milling is only one pass prior to completion. In other words, the grease sees the milling device or Gaulin mill one time during the course of manufacturing.

The entire system or process of creating the polyurea grease is preferably conducted at temperatures less than 350° F. Most preferably, the entire process sees only 320° F. at top temperature for a maximum dwell time of 5 minutes.

Optionally, typical grease additives such as extreme pressure additives, rust inhibitors, antiwear compounds and the like may be added to the mixture before milling.

In yet another embodiment of the invention, the finely powdered polyurea, rather than packaged, is fed directly to a grease kettle for mixing with a base oil and forming the mixture into a grease.

EXAMPLES

In the following Examples an air purge gun impingement device sold by Contrast Equipment Co., Kansas City, Mo., was used. The mixing chambers used were obtained from Glas-Craft Inc., Indianapolis, Ind., and had either flat, rectangular or round dispensing patterns. Fourier Transform Infrared Spectrometer ("FTIR") analysis of the reaction was conducted on appropriate product samples to determine whether the product contained free isocyanate. The FTIR allows evaluating a product in process by monitoring the spectral peaks. The standard ninhydrine test was used to determine if a product contained unreacted amine.

Comparative Example 1

In this comparative example the reaction chamber had a flat mixing chamber. The amine used was cyclohexyl amine, and the diisocyanate used was methylene diphenylene diisocyanate. The orifice diameter for the reactants were 0.071 inches and 0.042 inches respectively. The reactants were at ambient temperature (21° C.), and each was fed to the reaction chamber at 700 psig. Within 5 seconds the chamber clogged.

Comparative Example 2

The procedure of Comparative Example 1 was followed except a round mix chamber was used, and the pressure for each component was 1,000 psig. After about 3 seconds the chamber became clogged.

Example 1

In this example a round mix chamber reaction chamber was employed. The orifice diameter for the amine feed was 0.109 inches, while the orifice diameter for the diisocyanate was 0.052 inches. The cyclohexyl amine was dissolved in a naphthenic oil having a kinematic viscosity @ 40° C. of 143.21 cSt. The weight ratio of oil to amine was 1:1.2. Both the amine/oil feed and the diisocyanate feed were at 21° C. Then each were fed to the impingement device reaction chamber at 1000 psig. The resultant product had the consistency of a finely divided polyurea powder in which the diluent oil was dispersed. FTIR analysis failed to show a diisocyanate peak, and a ninhydrine test failed to show free amine establishing complete reaction. A sample of the product was mixed with an equal amount by weight of an oil typically used in formulating greases. The oil was readily incorporated in the product polyurea without any signs of separation.

Example 2

In this example a round mix chamber was used. The amine used was tallow amine which was dissolved in the naphthenic oil at a 2:1 oil to amine weight ratio. The diisocyanate was at 21° C. while the amine/oil feed was heated to 32° C. Both feeds were fed to the reactor at 1800 psig. The resultant polyurea product had a powdery consistency. FTIR analysis showed a diisocyanate peak at $2270^{-1}$ cm of about 27% transmittance. As with the product of Example 1, this product blended very easily with a grease lubricating oil without any sign of oil separation.

Another attempt was made to manufacture completely reacted powder by using the same round mix chamber, the oil to amine ratio was changed to 1:1.5 and the feed pressure to the mix chamber was changed to 1000 psi. As a result, FTIR analysis failed to show a diisocyanate peak, and a ninhydrine test failed to show free amine establishing complete reaction. A sample of the product was mixed with an equal amount by weight of an oil typically used in formulating greases. The oil was readily incorporated in the product polyurea without any signs of separation.

Figure 2:
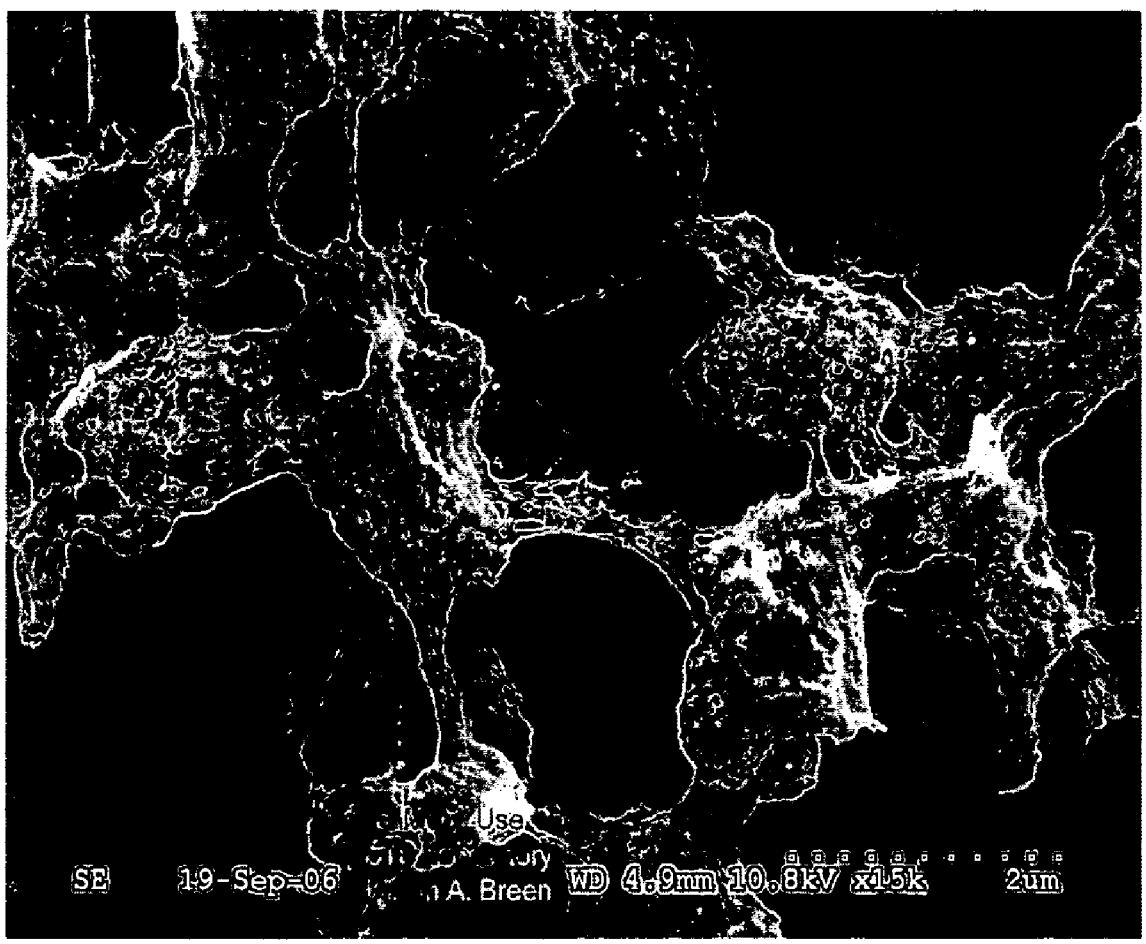
FIG. 2 is a microphotograph of a polyurea particle made by impingement processing washed free of lubricating medium.

An important aspect regarding prior art is that the structure of the particles are comparatively different. The prior art formulation and manufacturing of the polyurea powder results in the structure of polyurea particles being solid, compact and vary in size. U.S. Pat. No. 5,314,982 and U.S. patent application Ser. No. 2006/0052261 are examples of the prior art. In comparison, polyurea particles made by impingement processing also vary in size but, the structure of the particle itself is different. The polyurea particles manufactured, by virtue of the processing described in this patent, are porous and sponge like (foamy cells) in their construction. The lubricating fluid used in the dilution of the amine, as explained in the examples presented, is encapsulated or rather occupy the interstices of the particle as shown in FIG. 2. As observed during impingement processing, there is no oil pooling or separation of the polyurea powder from oil during or after the powder is made.

The polyurea powder is less dense than commercially available prior art polyurea. The polyurea preferably has a density less than 6.5 lbs/gal, more preferably less than 6 lbs/gal and most preferably has a density of less than 5.75 lbs/gal. In addition, the new polyurea powder has a larger surface are than prior art polyurea. Preferably, the polyurea powder has a specific surface area of more than 20 m$^2$/g (measured by Hg porosimetry), more preferably 26 m$^2$/g and most preferably more than 32 m$^2$/g.

A shelf life study was conducted to monitor the integrity of a typical batch of impinged polyurea powder over a 12 month period. The observations made from the shelf life study are as follows: in general, the polyurea powder still maintained its original integrity after 12 months of storage, there was sign of excessive caking and no indication visibly or microscopically of oil leaching from the stored powder.

Regarding grease processing with the impinged preformed polyurea powder, the visibly large particles are easily broken apart, or fragmented, by the shearing devises, mills and homogenizers, used in grease processing. Thus, over time during the base grease processing prior to top temperature, the mass becomes thicker and more grease like as time and temperature increase over the course of the proscribed manufacturing process.

Grease made with polyurea using the new method has improved properties. Table 2 shows the different properties of the two polyurea greases. Sample A is a grease made with conventional polyurea and higher pressures. Sample B is a grease made with new polyurea and with new method. As shown in Table 2, Sample A made with the old prior art method of higher cook temperature and higher homogenization pressure exhibits poor penetration properties. Sample B shows improved properties using the new method of producing grease.

TABLE 2

Properties of the Polyurea Grease

| TEST | SAMPLE A | SAMPLE B |
|---|---|---|
| Homogenization pressure | @ 6000 psig | 1500 psig |
| Cook temp, ° F. | 400 | 320 |
| Thickener content, % | 12% | 12% |
| Appearance | smooth dark brown | smooth light brown |
| Penetration | | |
| Unworked | 300 | 294 |
| Worked (60x) | 324 | 292 |
| Extended (10K) | 400 | 100k = 353 |
| Points change (60x to ext) | 76 | 65 |
| Dropping Point, ° C. | 254 | 269 |

What is claimed is:

1. A system comprising:
    a) a high pressure impingement mixing device chamber for reacting mono-amines and isocyanates in the presence of a liquid diluent that is not to the mono-amines and isocyanates;
    b) pumps suitable for feeding the mono-amines and isocyanates and liquid diluents into the high pressure impingement mixing device;
    c) an orifice on the high pressure mixing device chamber for spraying the particulate polyurea formed by the reaction of mono-amines with isocyanates, the orifice diameter from about 0.030 to 0.150 inches.

2. The system of claim 1 wherein the liquid diluent is simultaneously mixed with the mono-amines and isocyanates wherein each component exhibits substantially similar densities.

3. The system of claim 1 wherein the mono-amines and isocyanates are fed to the impingement device in a mole ratio of about 1:1 to about 2:1, at a temperature in the range of about 0° C. to about 100° C. and a pressure above about 500 psig through reactor orifices.

4. The system of claim 1 wherein the particles are passed through a containment zone equipped with FTIR monitoring means.

5. The system of claim 1 including process control means operably connected to the a monitoring means for adjusting processing conditions when necessary to maintain substantially complete reaction.

6. A system for preparing polyurea grease comprising:
    a. means for pumping mono-amines and isocyanates in the presence of a liquid diluent that is inert to the mono-amines and isocyanates in a high-pressure impingement mixing device chamber with an orifice, the orifice diameter from about 0.030 to 0.150 inches under conditions sufficient to produce a polyurea compound having the consistency of a powder and in which diluent is dispersed;
    b. means for processing the polyurea and a lubricating oil in a processing vessel at temperatures less than 350° F.;
    c. means for milling the processed polyurea and lubricating oil at a pressure less than 2000 psi;
    d. means for cooling the processed polyurea to form polyurea grease.

7. The system of claim 6 further comprising means for additizing the grease to achieve favorable properties.

8. The system of claim 6 wherein the liquid diluent is simultaneously mixed with the amines and isocyanates wherein each component exhibits substantially similar densities.

9. The system of claim 6 wherein the system has a top temperature of below 350° F. and a maximum dwell time of 5 minutes.

10. The system of claim 6 wherein the amines and isocyanates are fed to the impingement device in a mole ratio of about 1:1 to about 2:1, at a temperature in the range of about 0° C. to about 100° C. and a pressure above about 500 psig through reactor orifices having an orifice of from about 0.030 to about 0.109.

11. The system of claim 6 wherein the particles are passed through a containment zone equipped with FTIR monitoring means.

12. The system of claim 6 including process control means operably connected to the a monitoring means for adjusting processing conditions when necessary to maintain substantially complete reaction.

13. The system of claim 6 wherein the processed polyurea and lubricating oil utilizes the means for milling only once.

14. A device for making a particulate polyurea composition comprising
    a. an impingement reactor
    b. pumps suitable for feeding a solution of a mono-amine and a liquid diluent that is inert to mono-amines and isocyanines into the impingement reactor while feeding a isocyanine into the impingement reactor;
    c. an orifice on the impingement reactor for spraying the particulate polyurea formed by the reaction of isocyanine with the solution, the orifice diameter from about 0.030 to 0.150 inches.

15. The device of claim 14 wherein the pumps are designed to feed individual component or component solutions at pressures of from about 1000 psi to about 1800 psi.

16. The device of claim 14 wherein the impingement reactor is kept at temperatures in the range of from about 24° C. to about 55° C.

17. A device for forming a grease comprising:
a) a high pressure impingement mixing device chamber for reacting mono-amines and isocyanates in the presence of a liquid diluent that is inert to the mono-amines and isocyanates;
b) pumps suitable for feeding the mono-amines and isocyanates and liquid diluents into the high pressure impingement mixing device;
c) an orifice on the high pressure mixing device chamber for spraying the particulate polyurea formed by the reaction of mono-amines with isocyanates, the orifice diameter from about 0.030 to 0.150 inches;
d) a processing vessel for mixing a base lubricating oil and a polyurea particle;
e) means for heating the mixture of base oil and polyurea to a temperature in the range of about 150° C. to about 175° C.; and
f) a milling device for milling the heated mixture to form a homogenized grease at a pressure less than 2000 psi.

* * * * *